United States Patent Office 3,314,946
Patented Apr. 18, 1967

3,314,946
16α,17α-ACETONIDES OF 19-NOR PREGNANE DERIVATIVES AND INTERMEDIATES IN THE PREPARATION THEREOF
Josef Fried, Chicago, Ill., and Mariano Andrew Guiducci, Edison, N.J., assignors to E. R. Squibb & Sons, Inc., New York, N.Y., a corporation of Delaware
No Drawing. Filed June 8, 1966, Ser. No. 555,976
10 Claims. (Cl. 260—239.55)

This application is a continuation-in-part of our previous application, Ser. No. 314,638, filed Oct. 8, 1963, now abandoned, which is also a continuation-in-part application of our previous application, Ser. No. 212,153, filed July 24, 1962, and now abandoned.

This invention relates to and has for its objects the provision of new physiologically active steroids, methods for preparing the same, and new intermediates useful in said preparation.

The final products of this invention are steroids which may be represented by the formulae:

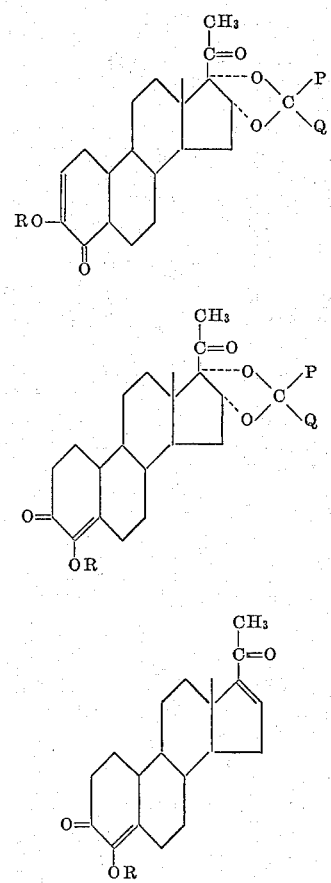

and

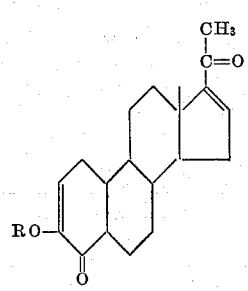

wherein R is hydrogen or the acyl radical of a hydrocarbon carboxylic acid of less than twelve carbon atoms; P and Q each represents a member of the group consisting of hydrogen, lower alkyl, halo-lower alkyl, monocyclic aromatic, monocyclic aromatic lower alkyl, monocyclic heterocyclic, monocyclic heterocyclic lower alkyl, and, together with the carbon atom to which they are attached, P and Q are selected from the group consisting of cycloalkyl and monocyclic heterocyclic.

The compounds of this invention are physiologically-active substances which possess progestational activity when administered both in the form of tablets and as a solution or suspension and hence can be used in lieu of known progestational agents such as progesterone in the treatment of habitual abortion for which purpose they can be administered in the same manner as progesterone, for example, the dosage being adjusted for the relative potency of the particular steroid.

The final products of this invention are prepared by the process of this invention which entails a number of steps beginning with a 16-substituted 19-norprogesterone. The steps of the process are shown by the following equations wherein R, P and Q are as hereinbefore defined.

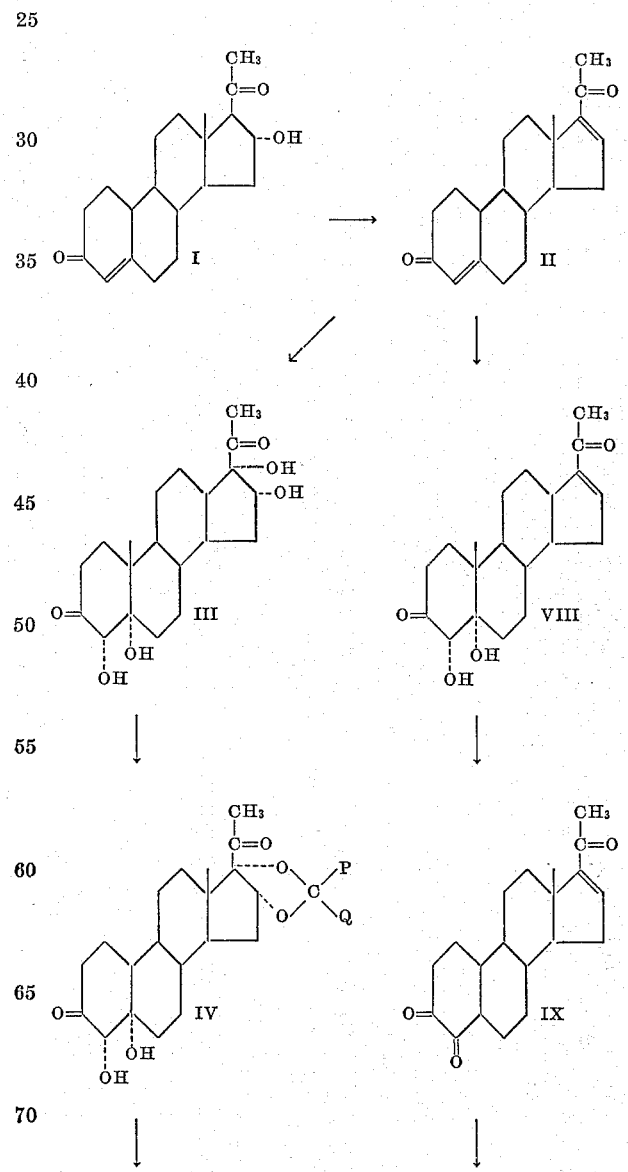

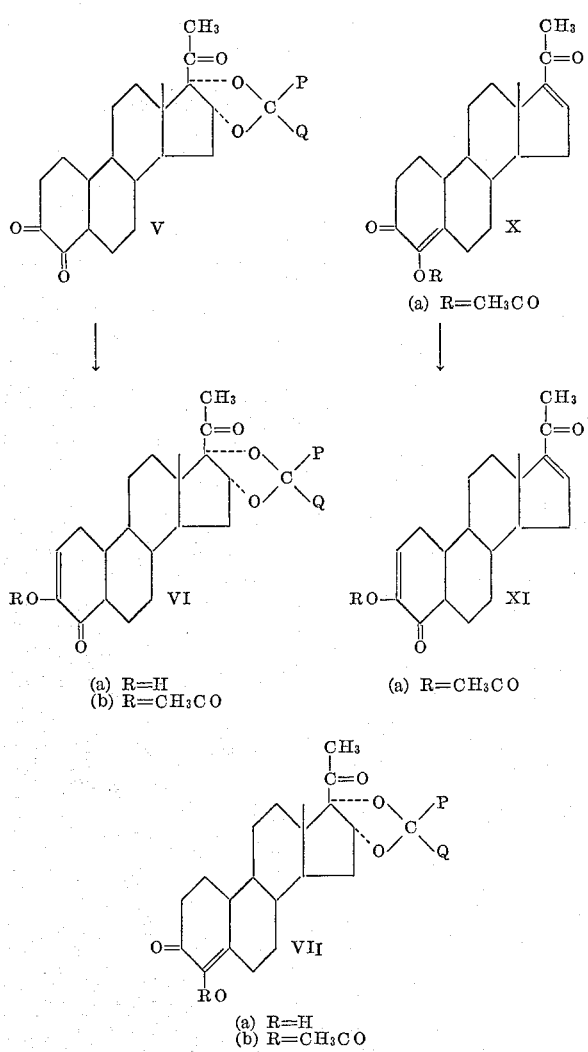

(a) R=CH₃CO (a) R=H
(b) R=CH₃CO (a) R=CH₃CO (a) R=H
(b) R=CH₃CO

In the first step of this process 16α-hydroxy-19-norprogesterone (I) is dehydrated as by treatment with aluminum tertiary butoxide at elevated temperature to yield Δ¹⁶-19-norprogesterone (II), which is a new compound of this invention.

The Δ¹⁶-19-norprogesterones (II) may then be oxidized by treatment with two mole equivalents of an oxidizing agent such as osmium tetroxide in the absence of light to yield the 19-norpregnane-4α,5α,16α,17α-tetrol (III), which is also a new compound of this invention.

The 19-nor-pregnane tetrol (III) may then be reacted with an aldehyde or ketone of the formula

wherein P and Q are as above-defined, and recovering the resultant acetal or ketal derivative. The reaction is preferably carried out by treating a suspension or solution of the steroid in the aldehyde or ketone (or an organic solvent if the aldehyde or ketone is a solid) with an acid catalyst (e.g. perchloric acid, p-toluenesulfonic acid, hydrochloric acid, etc.) neutralizing the acid and recovering the 16α,17α-acetal or ketal derivative (IV) formed, which are also new compounds of this invention.

Suitable aldehyde and ketone reactants include monocyclic aromatic aldehydes such as benzaldehyde, halobenzaldehydes (e.g. p-chlorobenzaldehyde), lower alkoxy benzaldehydes (e.g., o-anisaldehyde), di(lower alkoxy) benzaldehydes (e.g. veratraldehyde), hydroxybenzaldehydes (e.g. salicylaldehyde), dihydroxy-benzaldehydes (e.g. resorcyaldehyde), lower alkyl benzaldehydes (e.g. m-tolualdehyde and p-ethylbenzaldehyde), di(lower alkyl) benzaldehydes (e.g. o-p-dimethylbenzaldehyde), nitrobenzaldehydes, acylamidobenzaldehydes (e.g. N-acetylanthranilaldehyde), and cyanobenzaldehydes; monocyclic aromatic lower alkanals, such as phenylacetaldehyde, α-phenylpropionaldehyde, β - phenylpropionaldehyde, λ-phenylbutraldehyde, and aromatically-substituted halo, lower alkoxy, hydroxy, lower alkyl, nitro, acylamido and cyano derivatives thereof; monocyclic heterocyclicaldehydes, such as alloxane, picolinaldehydes, furfural, thiophene carbonals, and halo, lower alkoxy, hydroxy, lower alkyl, nitro, and cyano derivatives thereof; and monocyclic heterocyclic lower alkanals, monocyclic aromatic ketones, such as acetophenone, propiophenone, butyrophenone, valerophenone, isocaprophenone, halophenyl lower alkyl ketones (e.g. p - chloroacetophenone), lower alkoxy, phenyl lower alkyl ketones (e.g. p-anisyl methyl ketone), di(lower alkoxy)phenyl lower alkyl ketones, hydroxyphenyl lower alkyl ketones, dihydroxyphenyl lower alkyl ketones (e.g. resacetophenone), (lower alkyl) phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. nitroacetophenone), acylamidophenyl lower alkyl ketones (e.g. acetylanilines), and cyanophenyl lower alkyl ketones; benzophenone, and mono or bis substituted halo, lower alkoxy, hydroxy, lower alkyl, nitro, acylamido and cyano derivatives thereof; monocyclic aromatic lower alkanones, such as 1-phenyl-3-butanone and 1-phenyl-4-pentanone and aromatically substituted derivatives thereof; monocyclic heterocyclic ketones, such as 2-acetyl-furan, 2-benzoyl furan, and 2-acetylthiophene; and monocyclic heterocyclic lower alkanones.

The 16α,17α-acetal or ketal derivatives (IV) are dehydrated as by treatment with an alcoholic base, such as methanolic potassium hydroxide to yield the 19-norpregnane-3,4,20-trione (V).

The 19-norpregnane-3,4,20-triones (V) may then be acetylated as by treatment with pyridine and acetic anhydride for an extended period at room temperature, to yield the final products of this invention, which are substituted in the 16 and 17 positions (VI and VII).

In order to obtain the final products of this invention which possess a double bond in the 16 position, the Δ¹⁶-19-norprogesterone (II) are oxidized as by treatment with one mole of an oxidizing agent, such as osmium tetroxide to yield the 4α,5α-dihydroxy-Δ¹⁶-norpragnenes (VIII).

The 4α,5α-dihydroxy-Δ¹⁶-19-norpregnenes (VIII) are then dehydrated as by reaction with an alcoholic base, such as methanolic potassium hydroxide to produce the Δ¹⁶-19-norpregnene-3,4,20-triones (IX).

The Δ¹⁶-19-norpregnenes-3,4,20-triones (IX) may then be acetylated as by treatment with pyridine and acetic anhydride for an extended period at room temperature, to yield the final 16 dehydro-19-norpregnenes (X and XI).

The following examples illustrate the invention (all temperatures being in centigrade):

EXAMPLE 1

*16α-hydroxy-19-norprogesterone (I)*

(a) *Fermentation.*—Surface growth from a two week old agar slant culture of *Streptomyces roseochromogenes*, WC 3689 (Institute of Microbiology, Rutgers University, New Brunswick, N.J.), the slant containing the following medium:

| | G. |
|---|---|
| Glucose | 10 |
| Yeast extract | 2.5 |
| K₂HPO₄ | 1 |
| Agar | 20 |

Distilled water to 1 liter.

is suspended in 5 ml. of a 0.01 Dupanol aqueous solution. One ml. portions of the suspension are used to inoculate ten 250 ml. Erlenmeyer flasks, each containing 50 ml. of the following sterilized medium (A):

| | G. |
|---|---|
| Soybean | 20 |
| Glucose | 30 |
| Soybean oil | 2.2 |
| $CaCO_3$ | 2.5 |
| Distilled water to 1 liter. | |

After 66 hours' incubation at 25° with continuous rotary agitation (280 cycles per minute; 2 inch radium), 10% (vol./vol.) transfers are made to forty 250 Erlenmeyer flasks, each containing 50 ml. of freshly sterilized medium A plus 300 micrograms/ml. of 19-norprogesterone. (The steroid is added by supplementing each flask with 0.25 ml. of a sterile solution of N,N-dimethylformamide containing 60 mg./ml. of 19-norprogesterone.) After 28 hours of further incubation, the contents of the flasks are pooled and the pH adjusted to 4.5, using 12 N sulfuric acid. The broth is then filtered through a Buchner-Seitz clarifying pad apparatus. The filtrate has a volume of about 2400 ml.

(b) *Isolation and characterization.*—The filtrate obtained in step (a) is extracted with two 700 ml., two 500 ml. and one 250 ml. portions of chloroform. The combined chloroform extracts are washed with water, dried over sodium sulfate and evaporated to dryness in vacuo. The resulting residue on crystallization from acetone-hexane affords pure 16α-hydroxy-19-norprogesterone, about 50% yields, possessing the following properties:

M.P. about 198–201°; $[\alpha]_D^{23}+101°$(c., 95 in chlf.); $\lambda_{max.}^{alc.}$ 240 m$\mu$ ($\epsilon = 15,200$); $\lambda_{max.}^{Nujol}$ 2.88, 5.85, 6.02 and 6.19$\mu$.

*Analysis.*—Calcd. for $C_{20}H_{28}O_3$ (316): C, 75.99; H, 8.92. Found: C, 76.10; H, 9.08.

EXAMPLE 2

$\Delta^{16}$-*19-norprogesterone (II)*

A solution of 50 mg. of 16α-hydroxy-19-norprogesterone (I) and 200 mg. of aluminum tertiary butoxide in 15 ml. of toluene is refluxed for 2 hours, cooled and diluted with water and benzene. The benzene layer was separated and washed successively with dilute hydrochloric acid, water, sodium bicarbonate solution and water, dried over sodium sulfate and evaporated to dryness in vacuo. Crystallization of the crude product from acetone-hexane yielded 43 mg. of pure $\Delta^{16}$-19-norprogesterone (II) with the following properties:

M.P. 177–179° C; $[\alpha]_D+114°$(c., .4 in chlf.); $\lambda_{max.}^{alc.}$ 238 m$\mu$ ($\epsilon = 22,800$); $\lambda_{max.}^{Nujol}$ 6.00, 6.19 and 6.30$\mu$.

*Analysis.*—Calcd. for $C_{20}H_{26}O_2$ (298): C, 80.49; H, 8.78. Found: C, 80.32; H, 8.77.

EXAMPLE 3

$\Delta^{16}$-*19-norpregnene-4α,5α-diol-3,20-dione (VIII)*

To a solution of 30 mg. of $\Delta^{16}$-19-norprogesterone (II) in 0.2 ml. of dry pyridine and 4 ml. of benzene is added 30 mg. of osmium tetroxide, which causes an immediate darkening of the solution. The reaction flask is protected from light while it is maintained at room temperature for 5 hours. A solution of 6 ml. of benzene, 7.5 ml. of water, 5 ml. of methanol, 235 mg. of sodium sulfite and 235 mg. of potassium bicarbonate is then added and the resulting mixture is stirred for an additional 18 hours at room temperature. After addition of 20 ml. of chloroform, the two layers are separated and the chloroform layer washer with water, dried over sodium sulfate and evaporated to dryness. The crude product, (27 mg.), is chromatographed on 1 g. of neutral alumina. Elution of the column with 50 ml. of benzene provides 5 mg. of $\Delta^{16}$-19-norpregnene-4α,5α-diol-3,20-dione (III) of the following properties:

M.P. 228–230° C., $\lambda_{max.}^{alc.}$ 237 m$\mu$; $\lambda_{max.}^{KBr.}$ 2.97 (broad); 5.85, 5.94 and 6.16$\mu$.

*Analysis.*—Calcd. for $C_{20}H_{28}O_4$ (332): C, 72.26; H, 8.40. Found: C, 72.28; H, 8.37.

EXAMPLE 4

*19-norpregnane-4α,5α,16α,17α-tetrol-3,20-dione (III)*

Following the same procedure set forth in Example 3 except that 60 mg. of osmium tetroxide is employed and the reaction time is extended to 18 hours, yields crude crystalline 19-norpregnane-4α,5α,16α,17α-tetrol-3,20-dione (III). Trituration of the crude product with methanol yields 17 mg. of crystalline material, M.P. 198–201° C. Recrystallization from acetone hexane gives an analytically pure sample of 19-norpregnane-4α,5α,16α,17α-tetrol-3,20-dione (III) with the following properties:

M.P. 213–215° C.; $[\alpha]_D^{23}+6.5°$ (c. 1.1 in methanol); $\lambda_{max.}^{KBr.}$ 2.97 (very strong), 5.79 and 5.88$\mu$.

*Analysis.*—Calcd. for $C_{20}H_{30}O_6$ (366): C, 65.55; H, 8.25. Found: C, 65.78; H, 8.59.

EXAMPLE 5

*19-norpregnane-4α,5α,16α,17α-tetrol-3,20-dione 16α,17α-acetonide (IV)*

To 5 ml. of a solution prepared from 100 ml. of acetone and 0.1 ml. of 70% perchloric acid is added at room temperature 11 mg. of 19-norpregnane-4α,5α,16α,17α-tetrol-3,20-dione (III). Half an hour later the reaction mixture is neutralized with sodium bicarbonate solution and the acetone removed by evaporation under reduced pressure. The resulting mixture is extracted with chloroform and the chloroform extract washed with water, dried over sodium sulfate and evaporated to dryness in vacuo. Crystallization of the crude product from acetone-hexane yields 9 mg. of material, M.P. 175–178° C. which on recrystallization from acetone-hexane provides an analytical sample of 19 - norpregnane-4α,5α,16α,17α-tetrol-3,20-dione 16α,17α-acetonide (IV) of the following properties: M.P. 175–178° C.; $[\alpha]_D^{23}-79°$ (c., .4 in chlf.); $\lambda_{max}$ 3–3.1 (broad), 5.76 and 5.85$\mu$ (2.86, 3.05).

*Analysis.*—Calcd. for $C_{23}H_{43}O_6$ (406): C, 67.95; H, 8.43. Found: C, 67.35; H, 8.53.

EXAMPLE 6

*19-norpregnane-16α,17α-diol-3,4,20-trione 16α,17α-acetonide (V)*

A solution of 28 mg. of 19-norpregnane-4α,5α,16α,17α-tetrol-3,20-dione 16α,17α-acetonide (IV) in 15 ml. of 2.5% methanolic potassium hydroxide is allowed to stand at room temperature for 5 hours. Aliquots are taken at various time intervals and the ultraviolet absorption spectra are measured. The reaction mixture develops a maximum at 310 m$\mu$ whose extinction coefficient becomes constant after 4 hours ($E^{1\%}=143$). The reaction mixture is acidified with dilute hydrochloric acid and the methanol removed under reduced pressure. Chloroform is added and the resulting solution washed with water, dried over sodium sulfate and evaporated to dryness in vacuo. 27 mg. of the crude 19-norpregnane-16α,17α-diol-3,4,20-trione 16α,17α-acetonide (V) gives a positive ferric chloride test and had an ultraviolet absorption spectrum absorption maximum at 273 m$\mu$ ($\epsilon=9,000$).

EXAMPLE 7

*Acetylation of 19-norpregnane-16α,17α-diol-3,4,20-trione 16α,17α-acetonide (V)*

The crude 19 - norpregnane-16α,17α-diol-3,4,20-trione 16α,17α-acetonide (V) obtained in Example 6 is acetylated by reacting with 1 ml. of dry pyridine and 0.5 ml. of acetic anhydride for 18 hours at room temperature. Evaporation of the total reaction mixture to dryness in vacuo yields 30 mg. of crude material which was chromatographed on 1 g. of neutral alumina. Elution with 10×25 ml. of benzene yields in the early fractions 6.5 mg. of 4-acetoxy-16α,17α-dihydroxy-19-norprogesterone 16α,17α-acetonide (VII) of the following properties: M.P. 200–205° and the later fractions 3-acetoxy-Δ²-19-norpregnene-16α,17α-diol-4-one 16α,17α-acetonide (VI) M.P. 228–233° C.;

$$\lambda_{max.}^{alc.} \ 232 \ m\mu$$

*Analysis.*—Calcd. for $C_{25}H_{34}O_6$ (430): C, 69.74; H, 7.96. Found: C, 69.81; H, 8.41.

EXAMPLE 8

*Δ¹⁶-19-norpregnene-3,4,20-trione (IX)*

Following the procedure of Example 6, but substituting 25 mg. of Δ¹⁶-19-norpregnene-4α,5α-diol-3,20-dione (VIII) for 19-norpregnane-4α,5α,16α,17α-tetrol-3,20-dione (IV) yields Δ¹⁶-19-norpregnene-3,4,20-trione (IX).

EXAMPLE 9

*Acetylation of Δ¹⁶-19-norpregnene-3,4,20-trione (IX)*

Following the procedure set forth in Example 7, but substituting Δ¹⁶-19-norpregnene-3,4,20-trione (IX) for 19-norpregnane-16α,17α-diol-3,4,20-trione 16α,17α-acetonide yields 4-acetoxy-Δ⁴,¹⁶-19-norpregnadiene-3,20-dione (Xb) and 3-acetoxy-Δ²,¹⁶-19-norpregnadiene-4,20-dione (XIb).

EXAMPLE 10

*Acetophenone derivative of 19-norpregnane-4α,5α,16α,17α-tetrol-3,20-dione*

To a suspension of 500 mg. of 16α,17α-dihydroxyprogesterone in 25 ml. of freshly redistilled acetophenone is added .125 ml. of 72% perchloric acid and the mixture is agitated at room temperature for one hour. The clear solution is washed with dilute sodium bicarbonate to remove excess acid and the acetophenone layer, after addition of chloroform is separated from the aqueous phase. The organic layer is dried over sodium sulfate and after removal of the chloroform and acetophenone in high vacuum, the residue is crystallized from 95% alcohol, thus yielding the acetophenone derivative of 19-norpregnane-4α,5α,16α,17α-tetrol-3,20-dione.

EXAMPLE 11

*Benzaldehyde derivative of 19-norpregnane-4α,5α,16α,17α-tetrol-3,20-dione*

To a suspension of 100 mg. of 19-norpregnane-4α,5α,16α,17α-tetrol-3,20-dione in 15 ml. of benzaldehyde is added 0.5 ml. of 72% of perchloric acid. The mixture is treated as in Example 9 and results in the summation of the benzaldehyde derivative of 19-norpregnane-4α,5α,16α,17α-tetrol-3,20-dione.

EXAMPLE 12

*Furfural derivative of 19-norpregnane-4α,5α,16α,17α-tetrol-3,20-dione*

Treatment of 19-norpregnane-4α,5α,16α,17α-tetrol-3,20-dione with furfural in the process of perchloric acid according to the procedure of Example 9 results in the formation of furfural derivative of 19-norpregnane-4α,5α,16α,17α-tetrol-3,20-dione.

EXAMPLE 13

*2-acetofurane derivative of 19-norpregnane-4α,5α,16α,17α-tetrol-3,20-dione*

Treatment of the 19-norpregnane-4α,5α,16α,17α-tetrol-3,20-dione with 2-acetofurane as described in Example 9 furnishes the 2-acetofurane derivative of 19-norpregnane-4α,5α,16α,17α-tetrol-3,20-dione.

This invention may be variously otherwise embodied within the scope of the appended claims.

What is claimed is:

1. A compound selected from the group consisting of steroids of the formulae:

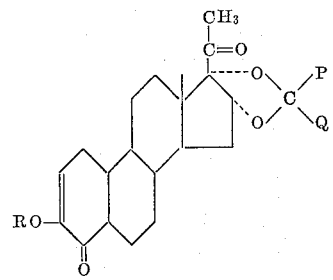

and

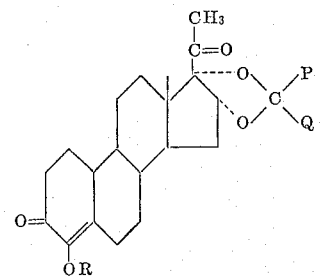

wherein R is selected from the group consisting of hydrogen and the acyl radical of a hydrocarbon carboxylic acid of less than twelve carbon atoms; P and Q each represents a member of the group consisting of hydrogen, lower alkyl, halo-lower alkyl, monocyclic aromatic, monocyclic aromatic lower alkyl, monocyclic heterocyclic, monocyclic heterocyclic lower alkyl, and, together with the carbon atoms to which they are attached, P and Q are selected from the group consisting of cycloalkyl and monocyclic heterocyclic.

2. A compound selected from the group of steroids having the formulae:

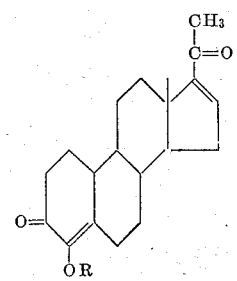

and

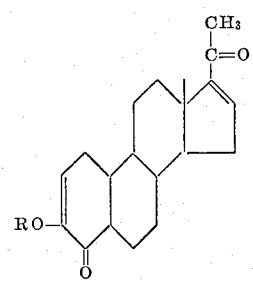

wherein R is the acyl radical of a hydrocarbon carboxylic acid of less than twelve carbon atoms.

3. Δ¹⁶-19-norpregnene-4α,5α-diol-3,20-dione.

4. 19-norpregnane-4α,5α,16α,17α-tetrol-3,20-dione.

5. A compound in accordance with the formula of claim 1 having the name 3-acyloxy-Δ²-19-norpregnene-16α,17α-diol-4-one-16α,17α-acetonide.

6. A compound in accordance with the formula of claim 1 having the name 4-acyloxy-16α,17α-dihydroxy-19-norprogesterone-16α,17α-acetonide.

7. A compound of the formula

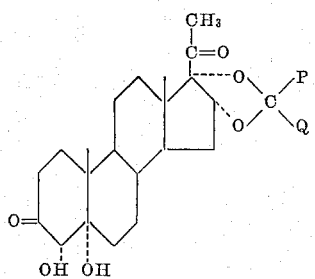

wherein P and Q each represents a member of the group consisting of hydrogen, lower alkyl, halo-lower alkyl, monocyclic aromatic, monocyclic aromatic lower alkyl, monocyclic heterocyclic, monocyclic heterocyclic lower alkyl, and together with the carbon atoms to which they are attached, P and Q are selected from the group consisting of cycloalkyl and monocyclic heterocyclic.

8. A compound of the formula

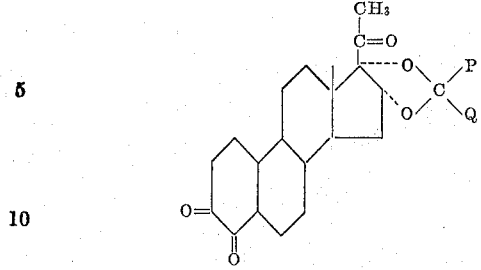

wherein P and Q each represents a member of the group consisting of hydrogen, lower alkyl, halo-lower alkyl, monocyclic aromatic, monocyclic aromatic lower alkyl, monocyclic heterocyclic, monocyclic heterocyclic lower alkyl, and together with the carbon atoms to which they are attached, P and Q are selected from the group consisting of cycloalkyl and monocyclic heterocyclic.

9. A compound in accordance with the formula of claim 7 having the name 19-norpregnane-4α,5α,16α,17α-tetrol-3,20-dione-16α,17α-acetonide.

10. A compound in accordance with the formula of claim 8 having the name 19-norpregnane-16α,17a-diol-3,4,20-trione-16α,17α-acetonide.

No references cited.

LEWIS GOTTS, *Primary Examiner.*

ELBERT L. ROBERTS, *Examiner.*